(12) United States Patent
Minami et al.

(10) Patent No.: US 8,786,150 B2
(45) Date of Patent: Jul. 22, 2014

(54) ROTOR SHAFT AND AC GENERATOR FOR VEHICLE

(75) Inventors: Shinichiro Minami, Tokyo (JP); Takahiro Kimura, Tokyo (JP); Kazunori Tanaka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 724 days.

(21) Appl. No.: 13/009,617

(22) Filed: Jan. 19, 2011

(65) Prior Publication Data

US 2012/0056501 A1 Mar. 8, 2012

(30) Foreign Application Priority Data

Sep. 2, 2010 (JP) ................. 2010-196608

(51) Int. Cl.
*H02K 5/16* (2006.01)
*H02K 5/173* (2006.01)

(52) U.S. Cl.
USPC ............................. 310/90; 384/537; 384/544

(58) Field of Classification Search
CPC ........ H02K 5/16; H02K 5/173; H02K 5/1732
USPC ..................... 310/90; 384/537, 544
See application file for complete search history.

(56) References Cited

U.S. PATENT DOCUMENTS

| | | | |
|---|---|---|---|
| 5,624,193 A | 4/1997 | Vogelsberger et al. | |
| 5,977,673 A * | 11/1999 | Iwata | 310/90 |
| 7,589,448 B2 * | 9/2009 | Nakano et al. | 310/90 |
| 7,618,193 B2 * | 11/2009 | Umeda et al. | 384/490 |
| 2005/0168085 A1 | 8/2005 | Ihata et al. | |
| 2006/0232153 A1 * | 10/2006 | Saito | 310/90 |
| 2007/0103019 A1 * | 5/2007 | Nakano et al. | 310/90 |
| 2007/0114863 A1 | 5/2007 | Shimoyama | |
| 2010/0150489 A1 * | 6/2010 | Maeda | 384/565 |
| 2012/0056501 A1 * | 3/2012 | Minami et al. | 310/90 |

FOREIGN PATENT DOCUMENTS

| | | |
|---|---|---|
| EP | 0 723 087 A1 | 7/1996 |
| JP | 63-198355 U | 12/1988 |
| JP | 2-65067 U | 5/1990 |
| JP | 2006-125432 A | 5/2006 |
| JP | 2007-143379 A | 6/2007 |
| JP | 4306476 B2 | 8/2009 |

OTHER PUBLICATIONS

Japanese Office Action dated Jul. 24, 2012, issued in Patent Application No. 2010-196608.

* cited by examiner

*Primary Examiner* — John K Kim
*Assistant Examiner* — David Scheuermann
(74) *Attorney, Agent, or Firm* — Sughrue Mion, PLLC

(57) ABSTRACT

A rotor shaft is supported in a rotatable manner at both ends by bearings respectively disposed to a housing forming a part of a stator and provided with a positioning portion of the bearing in at least one shaft end. The positioning portion is formed of an annular step-like rise portion that abuts on a circular arc surface provided to an inner ring corner of the bearing. A rotor shaft capable of holding the bearing in a stable manner over a long period is thus obtained without increasing the number of components and the numbers of working processes and assembly man-hours for the shaft. It thus becomes possible to solve problems, such as an increase in cost due to a large amount of working margin and increases of the direct material cost and in weight due to a larger finishing diameter of the shaft.

5 Claims, 4 Drawing Sheets

ROTOR SHAFT AND AC GENERATOR FOR VEHICLE

BACKGROUND OF THE INVENTION

1. Field of the Invention

The present invention relates to a rotor shaft provided with a bearing positioning portion and an AC generator for vehicle.

2. Background Art

An AC generator in the related art that is attached to an automobile engine and driven by this engine has, as is disclosed in Patent Document 1, a housing of a structure in which a pair of bowl-like front (drive end) frame and rear (rear end) frame is joined together with the respective openings facing each other and a stator in between. At the center, the front frame and the rear frame are provided, respectively, with cylindrical front bearing box (front box) and rear bearing box (rear box) mutually protruding inward in the axial direction. A front bearing and a rear bearing are installed to the front box and the rear box, respectively. Also, a rotation shaft (rotor shaft) of a rotor provided inside the stator is supported on the front bearing and the rear bearing in a rotatable manner. This rotor shaft is driven by an engine via a pulley installed at the tip end protruding outside the front frame.

The outer ring of the front bearing is fixed to the front bearing box whereas the rear bearing is press-fit to the shaft first and then press-fit to a rear bearing holder and held by the rear box. By providing the rotor shaft with a step about as thick as the bearing inner ring in the radial direction for the bearing to abut thereon, the press-fit position of the rear bearing in the axial direction is determined (see, for example, Document 1).

As a method of maintaining the bearing position, there has been proposed a method of using a bearing retainer plate after the rear bearing is press-fit in the rear bearing box (see, for example, Document 2).

As another example, there has been proposed a bearing fixing device formed of a step surface provided to the main shaft and an annular collar fit in an annular groove formed to be spaced apart from this step by a predetermined distance in the axial direction (see, for example, Document 3).

Patent Document 1: Japanese Patent No. 4306476
Patent Document 2: EP Patent No. 0723087
Patent Document 3: JP-A-2006-125432

The rotor shaft is formed by subjecting a blank shaft to machining operations, such as outside diameter lathe turning, processing, rolling, grinding, and grooving. The rear bearing is press-fit to the shaft by a press machine while being controlled by a press-fit height and a press-fit load. Further, the rotor ASSY (assembly) in which the rear bearing is press-fit is assembled by press-fitting the rear bearing portion of the rear ASSY in the bearing box.

When the bearing portion is press-fit in the bearing box in this manner, in a case where a bearing positioning mechanism is not provided to the rotor shaft, there is a problem that the fitting position of the bearing inner diameter portion shifts in the axial direction. With the shaft in the related art described in Patent Document 1, it is possible to use the step for positioning at the time of bearing press-fit. However, because it is necessary to increase the diameter of the blank shaft, there is a considerable amount of machining margin in LA (lathe turning), rolling, and grooving and the cost is increased. In addition, because the finishing diameter of the shaft becomes larger, the diameter of a slip ring becomes larger, too. This poses problems, such as an increase of the direct material cost and an increase in weight.

The mechanisms in the related art described in Patent Documents 2 and 3 use a plate and screws as a bearing retainer. Hence, there are problems that the number of components is increased and so are the number of assembly man-hours and the material cost.

SUMMARY OF THE INVENTION

The invention was devised to solve the problems discussed above and has an object to obtain a rotor shaft capable of holding a bearing in a stable manner over a long period by neither increasing the number of components nor increasing the number of working processes and the assembly man-hours for the shaft.

A rotor shaft according to one aspect of the invention is configured in such a manner that a fine step is provided to a bearing press-fit portion of the shaft. The rotor shaft is supported in a rotatable manner at both ends by bearings respectively disposed to a housing forming a part of a stator and provided with a positioning portion of the bearing in at least one shaft end. The positioning portion is formed of an annular step-like rise portion that abuts on a circular arc surface provided to an inner ring corner of the bearing.

According to the rotor shaft of the invention provided with a bearing position shifting preventing mechanism, which is the annular step-like positioning portion, the blank shaft diameter can be smaller. Hence, there is a smaller amount of machining margin and the direct material cost can be reduced. In addition, the weight of the shaft can be lighter. Further, the manufacturing cost can be reduced because an amount of machining is lessened. Hence, a total cost can be reduced in comparison with a shaft in the related art having a bearing bracket portion step.

When the rotor shaft of the invention is used in a rotating electrical machine, such as an AC generator for vehicle, the bearing does not shift considerably from the fixed position, which is the initial press-fit position. Hence, there is no interference with components in the vicinity of the bearing, for example, a slip ring and unintended contact or damage can be avoided. When the bearing shifts from the initial press-fit position, the bearing press-fit in the bearing box becomes inappropriate (the contact area of the bearing outer ring and the bearing box becomes smaller). Hence, stress acting on the bearing outer ring is increased. However, with the bearing press-fit normally in the bearing box as in the invention, stress is dispersed and deterioration of the life of the bearing can be prevented. The quality is thus enhanced.

The foregoing and other object, features, aspects, and advantages of the present invention will become more apparent from the following detailed description of the present invention when taken in conjunction with the accompanying drawings.

DESCRIPTION OF THE PREFERRED EMBODIMENTS

Figure 7:
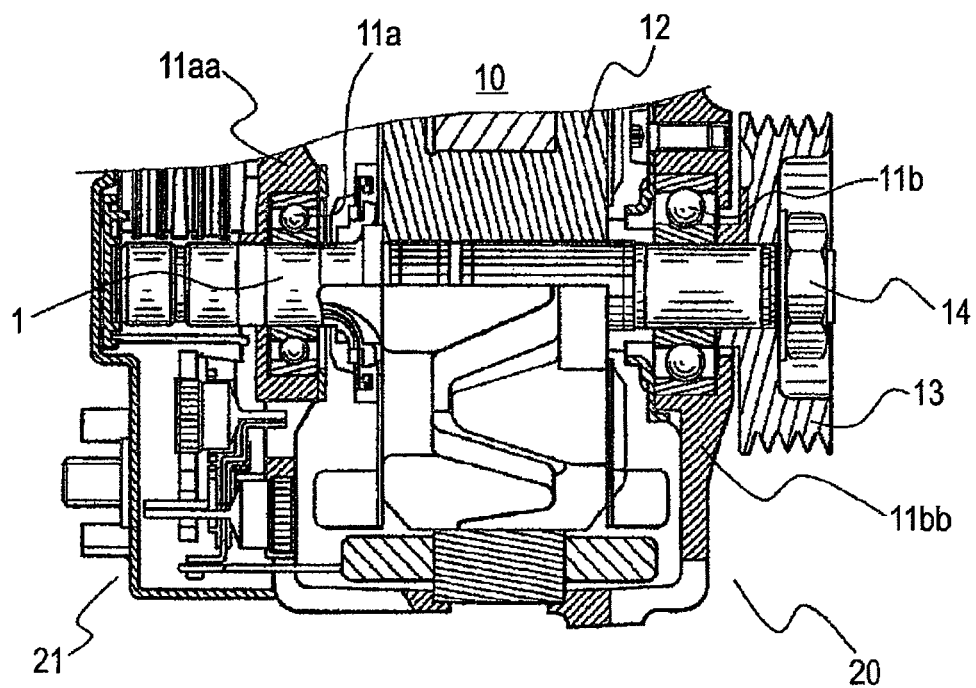
FIG. 7 is a cross section of an AC generator for vehicle adopting the rotor shaft of the invention.
Figure 8:
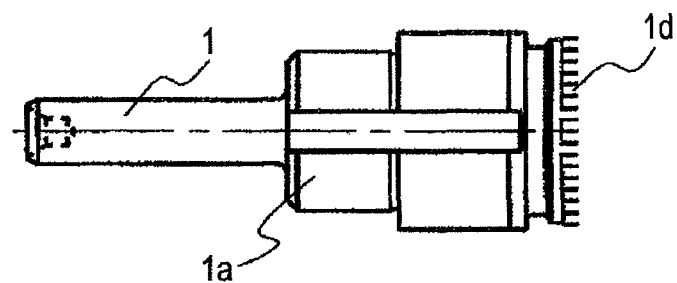
FIG. 8 is a side view of a rotor shaft in the related art having a bearing bracket.
Figure 9:
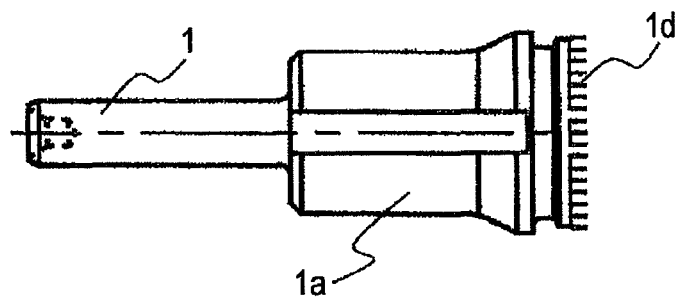
FIG. 9 is a side view of a rotor shaft in the related art having no bearing bracket.

A rotor shaft of the invention is adopted, for example, in an AC generator for vehicle as shown in FIG. 7.

Hereinafter, respective embodiments of the invention will be described on the basis of the drawings.

In the respective drawings, the same reference numerals denote the same or equivalent components.

First Embodiment

A rotor shaft according to a first embodiment of the invention will be described on the basis of FIG. 1, FIG. 2, and FIG. 7.

Figure 1:
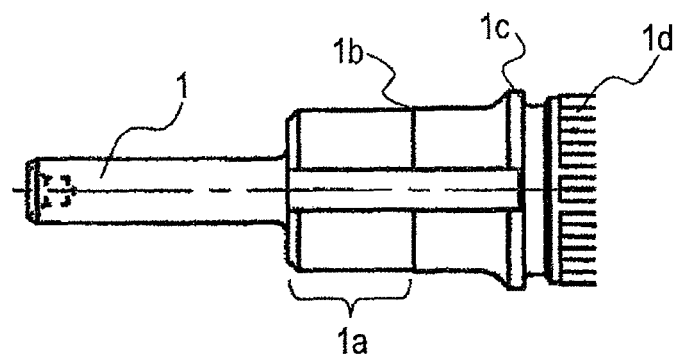
FIG. 1 is a side view of a rotor shaft according to a first embodiment of the invention.
Figure 2:
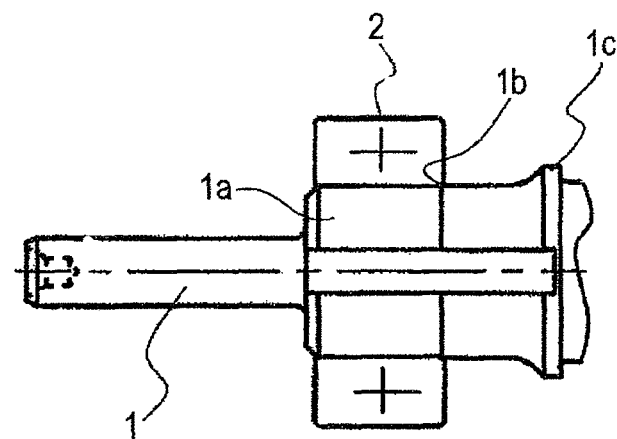
FIG. 2 is a side view showing a state in which a bearing is press-fit to the rotor shaft of FIG. 1.

As in a case adopted, for example, in an AC generator for vehicle of FIG. 7, a rotor shaft 1 shown in FIG. 1 and FIG. 2 is configured in such a manner that the both ends are supported in a rotatable manner on a pair of a front bearing lib and a rear bearing 11a that are respectively disposed to a housing 10 (rear bearing box 11aa and front bearing box 11bb) forming a part of a stator.

With this rotor shaft 1, the shaft diameter of a portion to serve as a bearing bracket is greater by several millimeters than a bearing press-fit portion 1a. The shaft is manufactured by lathe turning the blank shaft circumference of at least one shaft end (in FIG. 1, bearing press-fit portion at the left end) to serve as the bearing bracket and molding a serration portion 1d and a flange portion 1c by rolling followed by grinding of the bearing press-fit portion 1a.

Accordingly, the rotor shaft 1 is provided with a fine annular step-like positioning portion 1b by lathe turning the blank shaft circumference. It should be noted that the annular step-like positioning portion 1b is provided to at least one point in the circumferential direction.

Normally, an inner ring corner of the bearing is rounded correspondingly to the size of the ball bearing and formed in the shape of a circular arc surface R. The bearing is positioned as the positioning portion 1b abuts on the circular arc surface formed at the inner ring corner. In order to prevent shifting of the bearing position by this positioning of the bearing, the height of an annular step-like rise portion is, for example, shorter than the arc diameter R of the inner ring corner and set to a fine step, for example, the one indicated by (S1) or (S2) in FIG. 5. The dimensional relation of (S1) or (S2) will be described below on the basis of FIG. 6.

In the rear bearing press-fit process, for example, the press-fit position and the press-fit load of the bearing are checked to determine whether the result is OK or NG. The press-fit position is controlled by height with a servo press and the load is controlled by a press-fit load waveform.

The positioning portion 1b is provided so as to play a role of preventing shifting of the fitting position of the bearing inside diameter portion when the bearing is press-fit in the bearing box and it is not anticipated that the step is used actively at the time of bearing press-fit (the step is a dead end and it is not anticipated to press-fit the bearing to the step). Hence, it is possible to prevent shifting of the bearing position when there is a fine step.

When the bearing shifts from the initial press-fit position, the bearing press-fit in the bearing box becomes inappropriate (the contact area of the bearing outer ring and the bearing box becomes smaller) and stress acting on the bearing outer ring increases. However, the bearing press-fit in the bearing box normally as in the invention is able to disperse stress and thereby to suppress deterioration of the life of the bearing. The quality is thus enhanced.

Second Embodiment

Figure 3:
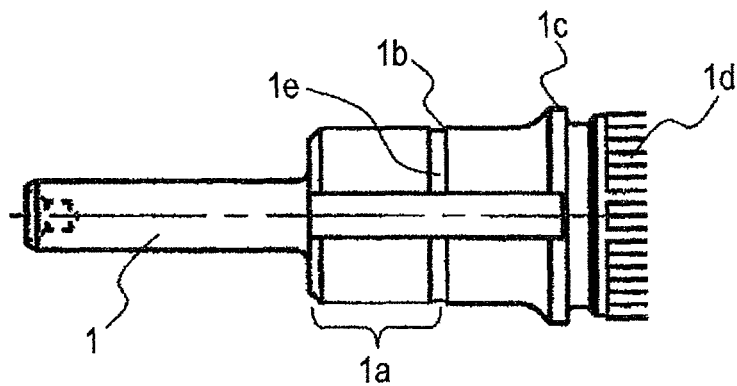
FIG. 3 is side view of a rotor shaft according to a second embodiment of the invention in which a bearing press-fit portion of the rotor shaft is provided with an annular clearance groove used to release chips.
Figure 4:
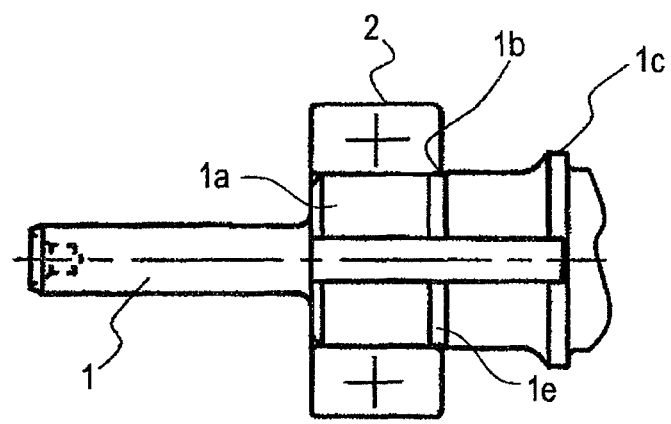
FIG. 4 is a side view showing a state in which a bearing is press-fit to the rotor shaft of FIG. 3.

A rotor shaft 1 according to a second embodiment of the invention is, as are shown in FIG. 3 and FIG. 4, configured in such a manner that an annular clearance groove 1e used to release chips generated by shaft grinding is provided to the bearing press-fit portion 1a at a position adjacent to an annular step-like positioning portion 1b (on the bearing insertion side).

By providing the annular clearance groove 1e, it becomes possible to release chips when the bearing press-fit portion 1a is ground. Hence, polishing can be performed in a stable manner and a shaft with good accuracy can be manufactured efficiently.

Third Embodiment

Figure 5:
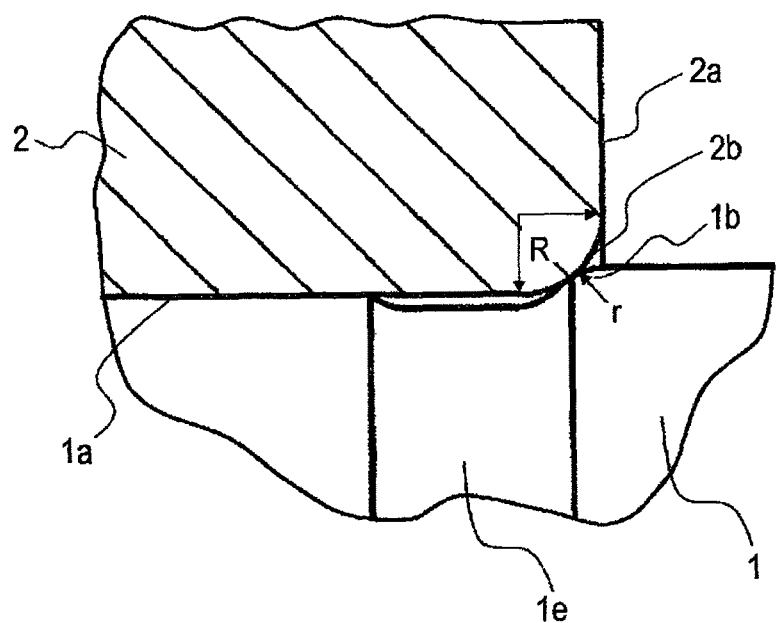
FIG. 5 is a sectional side view of an enlarged major portion (bearing press-fit portion) of a rotor shaft according to a third embodiment of the invention.

FIG. 5 is a sectional side view of an enlarged major portion (bearing press-fit portion) of a rotor shaft according to a third embodiment of the invention.

In contrast to the rise portion of the annular step-like positioning portion 1b in the first embodiment formed in a vertical plane shape, the rise portion of the rotor shaft in the third embodiment is formed in a circular arc shape having a radius r. The circular arc surface of this rise portion is continuous to the groove side-wall surface of the annular clearance groove 1e in the shape of a smooth curved surface (substantially an S-shaped surface).

By providing the annular clearance groove 1e and the circular arc rise portion in the shape of a smooth curved surface, stress acting on the bearing and the shaft can be mitigated when the bearing abuts thereon in comparison with a case where the step is an edge. It thus becomes possible to prevent deterioration of the life of the bearing.

Figures 6A, 6B:
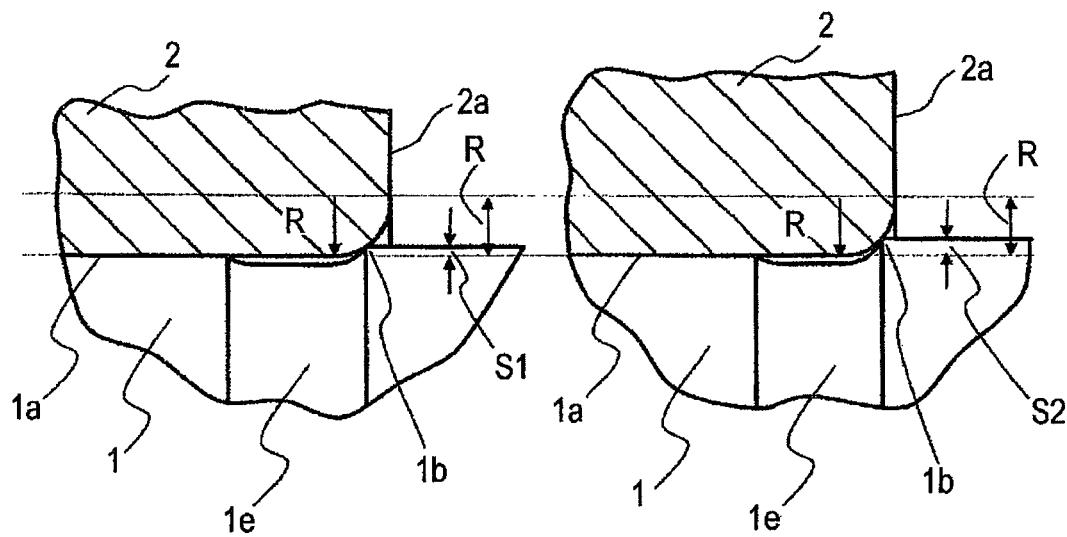
FIG. 6A and FIG. 6B are enlarged views of the bearing press-fit portion of FIG. 4, FIG. 6A showing a case where the height of a step-like rise portion is S1 and FIG. 6B showing a case where the height of the step-like rise portion is S2 that is greater than S1.

FIG. 6A and FIG. 6B are enlarged views of the bearing press-fit portion of FIG. 4. FIG. 6A shows a case where the height of the step-like rise portion is S1 and FIG. 6B shows a case where the height of the step-like rise portion is S2 that is greater than S1.

The height of the annular step-like rise portion, r, can be the minimum required height to stop the bearing and is not necessarily smaller than the arc diameter of the bearing inner ring corner. Also, even when the height of the rise portion, r, is minimal and smaller than the arc diameter of the bearing inner ring corner, the rise portion can exert a sufficient stopper function.

In a case where the height of the rise portion is the smaller S1, an amount of machining margin is small and the blank shaft can be smaller. In a case where the height of the rise portion is S2 that is greater than S1, the bearing stopper capability can be increased.

Fourth Embodiment

FIG. 7 is a cross section showing an example of a generator for automobile using the shaft of the invention.

This AC generator for vehicle is formed of a front ASSY 20 and a rear ASSY 21. Further, the front ASSY 20 is formed of a rotor ASSY 12, a front bracket 11bb, a front bearing 11b, a rear bearing 11a, a spacer, a pulley 13, and a nut 14.

In the AC generator for vehicle of the fourth embodiment, the rear bearing 11a is press-fit to the rotor using the rotor shaft 1 of the invention by a press machine. The front ASSY 20 is formed by combining the bracket and assembling is performed by press-fitting the rear bearing portion of the rear ASSY 21 in the rear bearing box 11a.

The positioning mechanism of the fourth embodiment is formed in an R-shaped shaft end face opposing an R-shaped surface provided to the bearing shaft end corner (see FIG. 5).

According to the fourth embodiment, it becomes possible to enhance the quality and the reliability of the generator without substantially increasing the weight and the direct material cost.

Various modifications and alterations of this invention will be apparent to those skilled in the art without departing from the scope and spirit of this invention, and it should be understood that this is not limited to the illustrative embodiments set forth herein.

What is claimed is:

1. A rotor shaft supported in a rotatable manner at both ends by bearings respectively disposed to a housing forming a part of a stator and provided with a positioning portion of the bearing in at least one shaft end,
   wherein the positioning portion is formed of an annular step-like rise portion that abuts on a circular arc surface provided to an inner ring corner of the bearing; and
   an annular clearance groove used to release chips generated by grinding is provided to an insertion side of the bearing to be adjacent to the annular step-like positioning portion.

2. The rotor shaft according to claim 1, wherein:
   the rise portion is a circular arc surface that abuts on the circular arc surface of the inner ring corner.

3. The rotor shaft according to claim 1, wherein:
   the annular step-like positioning portion is provided to at least one point in a circumferential direction.

4. The rotor shaft according to claim 1, wherein:
   a groove side wall of the annular clearance groove and a circular arc surface of the rise portion are connected in a shape of a smooth curved surface.

5. An AC generator for vehicle comprising:
   a stator provided in a housing that holds a front bearing and a rear bearing,
   wherein:
   the stator has a rotator shaft supported on the front bearing and the rear bearing in a rotatable manner;
   the rotor shaft is provided with an axial direction positioning portion of at least one of the bearings; and
   the rotor shaft is formed of the rotor shaft set forth in claim 2.

* * * * *